United States Patent [19]

Sugalski

[11] 4,319,178

[45] Mar. 9, 1982

[54] CHARGING SYSTEM WITH MULTIPLE ATTACHABLE CELLHOLDER MODULES

[75] Inventor: Raymond K. Sugalski, Gainesville, Fla.

[73] Assignee: General Electric Company, Gainesville, Fla.

[21] Appl. No.: 118,119

[22] Filed: Feb. 4, 1980

[51] Int. Cl.³ .................. H02J 7/00; H01M 10/46; H01M 2/10
[52] U.S. Cl. ............................. 320/2; 320/15; 429/100
[58] Field of Search ........................... 320/2–4, 320/15; 429/9, 96, 99, 100

[56] References Cited

U.S. PATENT DOCUMENTS

| | | | |
|---|---|---|---|
| 1,439,429 | 12/1922 | Lyhne | 429/100 X |
| 3,579,075 | 5/1971 | Floyd | |
| 3,941,618 | 3/1976 | Mabuchi | 429/99 |
| 4,009,429 | 2/1977 | Mullersman | 320/2 |

FOREIGN PATENT DOCUMENTS 2710260 10/1978 Fed. Rep. of Germany ...... 429/100

OTHER PUBLICATIONS

Western Electric Technical Digest, No. 45, Jan. 1977, p. 35.

Primary Examiner—Robert J. Hickey
Attorney, Agent, or Firm—Morgan, Finnegan, Pine, Foley & Lee

[57] ABSTRACT

A charging system for alternatively charging cells having different physical sizes and/or electrical characteristics comprising a charge current source, a plurality of cellholder charging modules and interconnection means on said charger and said modules for selective alternative connection of each of said modules to the charger. An improved charging module utilizes resilient loading tabs and an upper resilient arm radiating from the central axis of the module.

18 Claims, 8 Drawing Figures

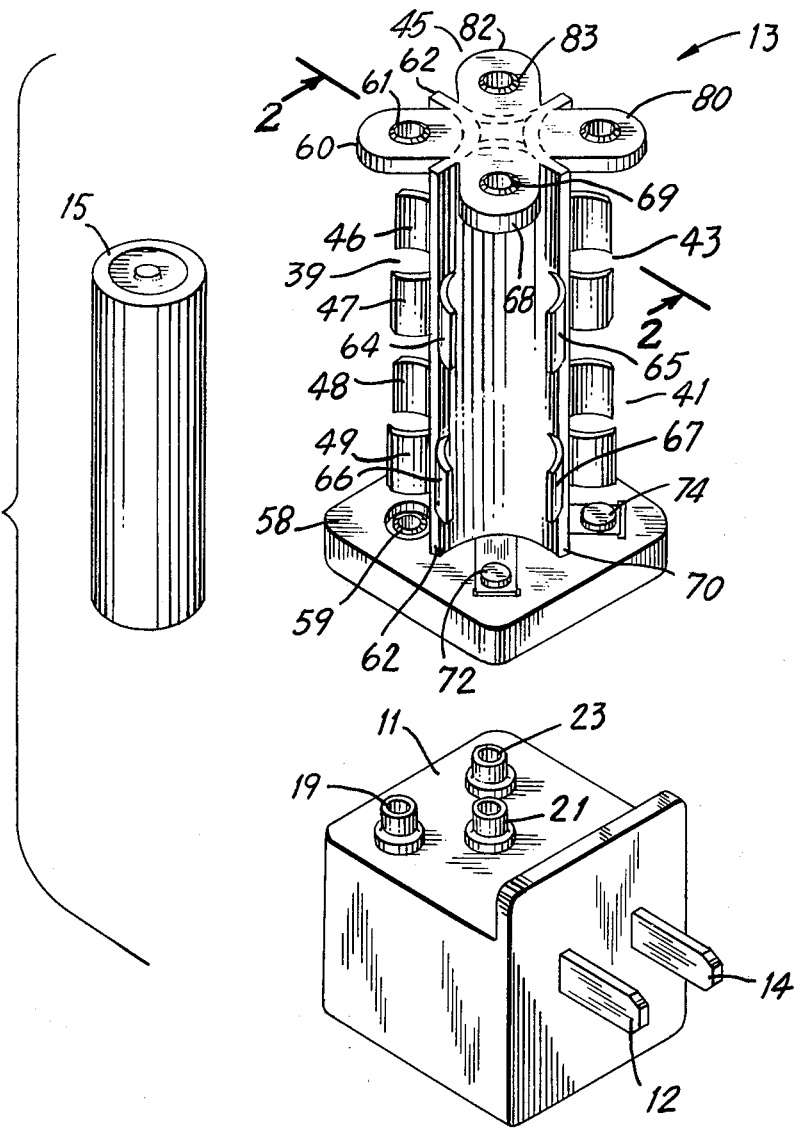
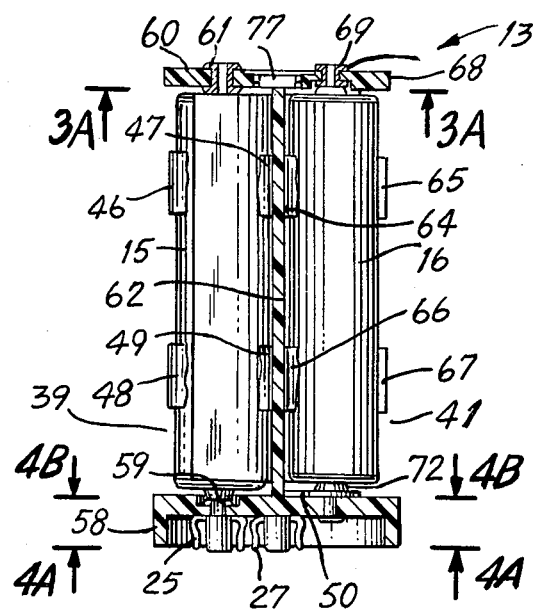

CHARGING SYSTEM WITH MULTIPLE ATTACHABLE CELLHOLDER MODULES

BACKGROUND OF THE INVENTION

This invention relates to an inexpensive charging system whereby rechargeable cells of different physical size and/or electrical characteristics are selectively and alternatively connectible to a charge current source for recharging.

There is an ever increasing number of consumer products on the market today which are capable of being operated by rechargeable cells such as nickel-cadmium cells. These products use cells having a plurality of physical sizes and electrical characteristics. Three of the most common sizes of nickel-cadmium cells used today are the AA, C and D sizes.

In the case of certain lines of nickel-cadmium cells, such as manufactured by the General Electric Company, the assignee of the invention herein, the electrical characteristics of the C and D size cells are the same, while the electrical characteristics of the AA size cells are different from that of the C and D sizes. The characteristics of these cells are summarized below.

| Size | Voltage | Capacity | Recommended Charge Current (Charge Rate C/10) |
|------|---------|----------|-----------------------------------------------|
| AA   | 1.2V    | .5 Ah.   | 50 mA.                                        |
| C    | 1.2V    | 1 Ah.    | 100 mA.                                       |
| D    | 1.2V    | 1 Ah.    | 100 mA.                                       |

The variety of cell types in wide use in the consumer market has given rise to the need to provide a unitary charging device to accommodate the various cell types. One such device is described in U.S. Pat. No. 3,579,075 issued on May 18, 1971 and assigned to the assignee of the invention herein. While this device provides a viable approach for charging cells of a variety of types, it has failed to achieve widespread adoption in the consumer market because of its complexity and cost of construction.

Another such device is described in U.S. Pat. No. 4,009,429. This device also requires relatively high assembly costs for various reasons. One particular problem with the device of U.S. Pat. No. 4,009,429 is that it utilizes conductive coil springs which function as an electrical contact to the cell as well as providing the cell with a tight resilient fit within the compartment of the device. The construction of the springs mounted on the wall of the device with an eyelet is difficult and expensive to manufacture.

The features and designs for charging systems described in the foregoing U.S. Pat. Nos. 3,579,075 and 4,009,429 are incorporated herein by reference.

Accordingly, it is an object of this invention to provide an improved system for accommodating a plurality of cell types.

Another object of this invention is to provide a charging system for a plurality of cell types which is safe, relatively inexpensive to manufacture and simple to operate.

SUMMARY OF THE INVENTION

These and other objects of the invention are accomplished by a charging system comprising a charge current source, a plurality of cellholder modules, each corresponding to one cell type, and interconnection means on said charger and said modules for selective, alternative connection of each said module to said charger. Another feature of the invention is provided by a cellholder module having an electrical circuit including a discharge prevention means for preventing the inadvertent discharge of cells disposed in said module.

A further feature of the invention is easier access to the cell compartment of the module and improved means for securely fitting the cell in the compartment.

Another advantage of the invention is a module which can be inexpensively fabricated.

BRIEF DESCRIPTION OF THE DRAWINGS

FIG. 1 is an exploded, perspective view of a charge current source and an "AA" cellholder module in accordance with the features of this invention.

FIG. 2 is a fragmentary cross-sectional view of the module of FIG. 1 taken along line 2—2.

FIGS. 7 and 8 depict an embodiment of a module different from that in FIG. 1.

DESCRIPTION OF THE PREFERRED EMBODIMENTS

In FIGS. 1 and 2, a charging system for charging a plurality of cell types in accordance with a preferred embodiment of this invention is illustrated. The system is generally comprised of a charge current source 11 and cellholder module 13. FIG. 1 is an exploded perspective view of the relationship assumed by source 11 and module 13 when connected for charging.

For purposes of illustration only, a cellholder module is shown for the "AA" cell type. The modules for other common cells such as sizes "C" and "D" cells are mechanically and electrically identical in construction except that the module for "C" size cells is physically dimensioned to accept the smaller "C" size cells and the module for "D" size cells is physically dimensioned to accept the larger "D" size cells. Accordingly, only the module for "AA" size cells will be described as exemplary. However, as will be clear to those skilled in the art, the invention is not limited to any particular number of cellholder modules, nor is it limited to a system for charging any particular cell type.

Figure 5:
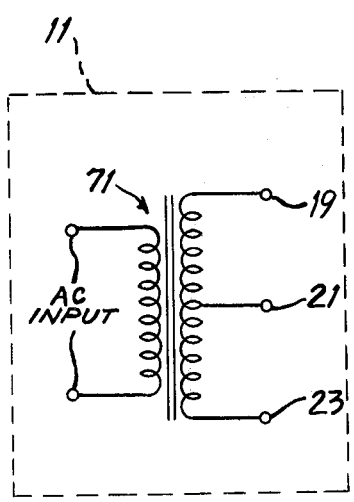
FIG. 5 is a circuit diagram of the charge current source of FIG. 1.

The charge current source 11 is comprised of a conventional high impedance center tapped transformer shown schematically in FIG. 5. Two blades 12, 14 are provided on one face of the charger housing for connection to a source of 120 V AC.

Figure 3A:
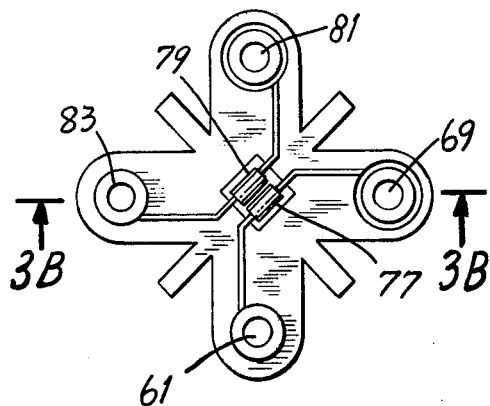
FIG. 3A is a plan view of top end of the module of FIG. 2 taken along line 3A—3A.
Figure 4A:
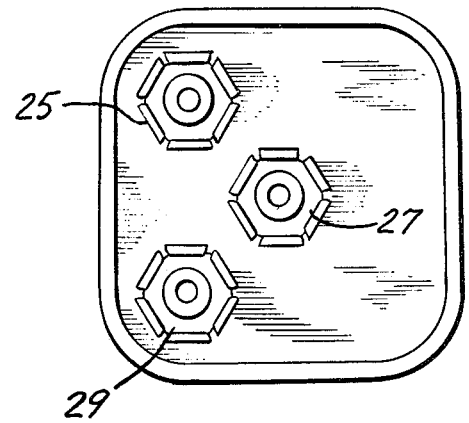
FIG. 4A is a plan view of the bottom end of the module of FIG. 2 taken along line 4A—4A.
Figure 3B:
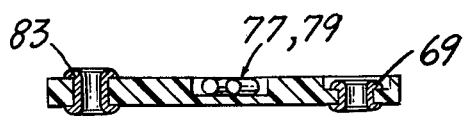
FIG. 3B is a fragmentary cross-sectional view of the top end of the module of FIG. 3A taken along line 3B—3B.
Figure 4B:
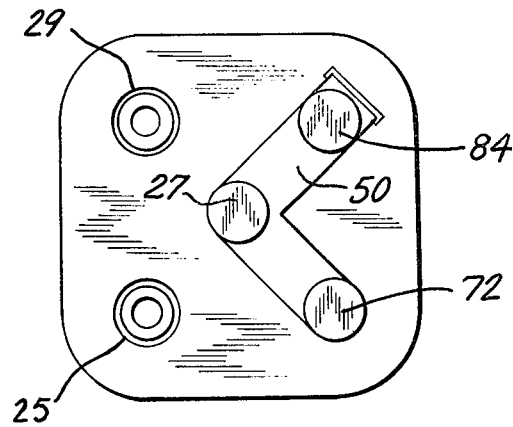
FIG. 4B is a plan view of the bottom end of the module of FIG. 2 taken along line 4B—4B.

The module 13 is adapted to be selectively connectible to the source 11 via interconnection means provided on source 11 as terminals 19, 21, 23 and on module 13, as terminals 25, 27, 29 (FIGS. 4A and 4B).

The modules are preferably of a molded plastic construction wherein the bottom end appears as a base and the top end appears as a plurality of resilient arms, with the compartments between the ends. The base and top ends can be separately molded and affixed to the compartment section such as by ultrasonic welding. Each module contains a plurality of compartments for mounting cells of a particular type. As shown in FIG. 1, module 13 has four compartments, 39, 41, 43 and 45 for accomodating four AA cells, 15, 16, 17, 18, respectively. Two of the compartments are shown in FIG. 2 where compartment 39 is shown with an "AA" cell 15 and compartment 41 is shown with an "AA" cell 16.

The bottom end of each module comprises a base 58 and the top end comprises a plurality of resilient arms 60, 68, 80 and 82 radiating from the center axis, each are associated with one of the compartments 39, 41, 43 and 45. Each of the compartments 39, 41, 43, 45 of module 13 is similarly constructed. For example, compartment 39 is defined by two pair of resilient side wall loading tabs 46, 47, 48, 49, partition walls 62, 63, resilient arm 60 and an end wall in base 58.

Figure 7:
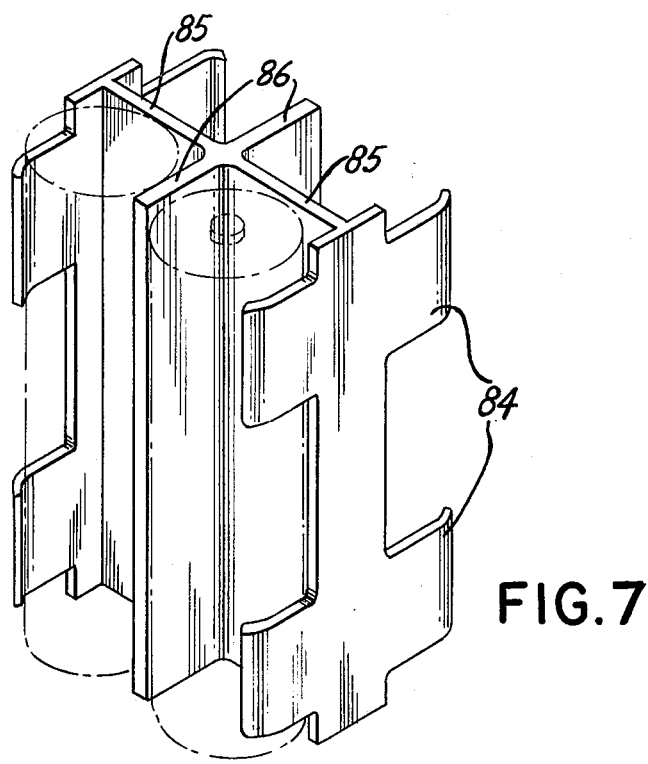
FIGS. 7 and 8 are perspective view of the compartment portion of a module in accordance with this invention.
Figure 8:
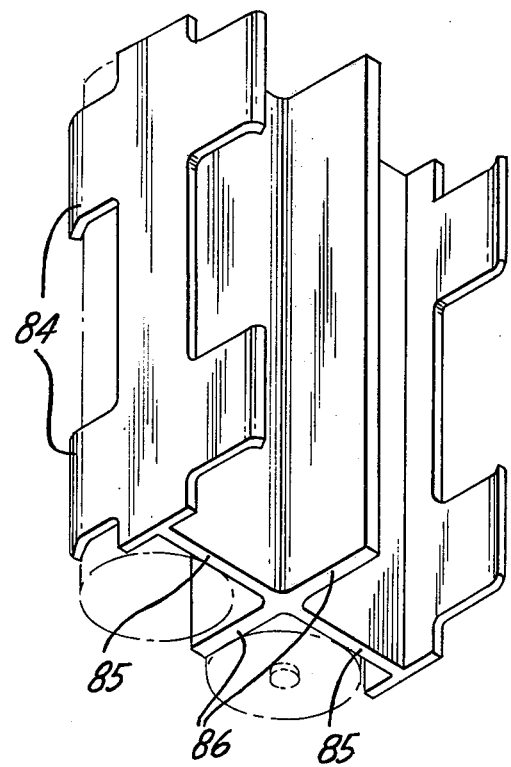

The compartment section of the module can alternatively take the form illustrated in FIGS. 7 and 8. The module shown in FIG. 1 utilizes two pair of resilient side wall loading tab means in addition to two partition walls to partially separate adjacent compartments. The compartment section of FIGS. 7 and 8 use only one pair of resilient side wall loading tab means, e.g., 84, in addition to two partition walls 85, 86 in separating adjacent compartments. One advantage of the embodiment shown in FIGS. 7 and 8 is that the cross-section of the compartments is not symmetrical, which encourages proper positioning of the cells. When only two cells are being charged, the cells must be inserted into compartments of the same circuit as will be discussed below.

The resilient arm 60 at the top end of compartment 39 contains an electrically conductive eyelet 61. Eyelet 61 provides an electrical contact to the negative terminal of cell 15 in compartment 39. The resilient arm 60 is resilient to the extent that it can be deflected away from the opposite end wall 58 to allow a cell to be introduced into and removed from compartment 39, while the arm provides a tight resilient fit for the cell when mounted on the end wall of base 58 in compartment 39. The resilient arm should be of an engineering plastic such as an acetal homopolymer which has suitable resiliency at ambient temperatures.

At the bottom end of compartment 39, a contact eyelet 59 is mounted in and extends through the end wall of base 58 to provide electrical connection between terminal 25 and the positive terminal of a cell 15 disposed in compartment 39.

Compartment 41 is similarly defined by two pairs of resilient tabs 64, 65, 66, 67, resilient arm 68 and base 58 and partition walls 62, 70. Electrical contact to the negative terminal of cell 16 is made via an eyelet 72 fixed to the wall of base 58. Eyelet 72, which is mounted through that end wall 58 and a metallic connector plate 50 on which terminal 27 is mounted provides electrical connection between the negative terminal of cell 16 and terminal 27. Electrical contact to the positive terminal of cell 16 is made via a contact eyelet 69. Electrical connection between the eyelets 61 and 69 is provided through a diode 77 for reasons as will be explained fully hereinbelow in connection with FIG. 6.

The remaining two compartments 43, 45 of module 13 have a construction identical to the compartments 39, 41 previously described. Cell 17 in compartment 43 would have its positive terminal in contact with eyelet 74 which is mounted through the end wall of base 58 to form an electrical connection with terminal 29. The negative terminal of cell 17 is in contact with eyelet 81 on arm 80. In compartment 45, cell 18 has its negative terminal contacting eyelet 84 mounted through the end wall of base 58 and a metallic connector plate 50 on which terminal 27 is mounted. The positive terminal of cell 17 in compartment 43 and the negative terminal of cell 18 in compartment 45 are electrically connected via a diode 79. The foregoing connections are all made in analogous manner to that previously described for compartments 39, 41.

A feature of this invention in accordance with a preferred embodiment thereof is provided by the loading tabs. Loading tabs, e.g., 46, 47, 48, 49, reduce the opening of compartment 39 to a size such that when loading and unloading a cell, for example in compartment 39, the cell must be loaded by inserting the cell in the region between the loading tabs and sliding the cell substantially laterally, spreading the tabs apart and flexing arm 60 outward increasing the opening to allow the cell to fit in the compartment. The positive terminal of the cell when in proper position in compartment 39 should be in contact with eyelet 61 and securely fit within the compartment.

One advantage of the present invention becomes apparent during loading and unloading because there are no coil springs associated with the compartment. A problem with conventional cell holders is that the coil spring can damage the cell as the end of the coil has a tendency to catch on the exterior housing of the cell.

Figure 6:
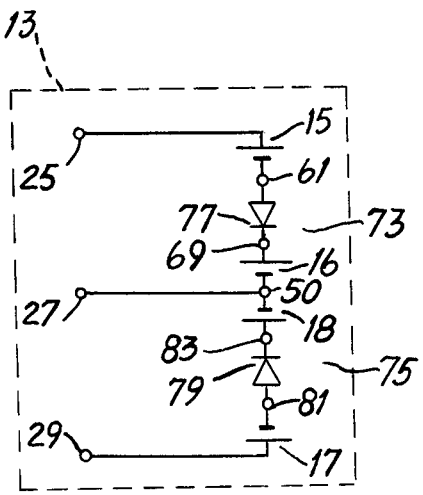
FIG. 6 is a circuit diagram of the module of FIG. 1.

FIGS. 5 and 6 show a diagram of a preferred embodiment of an electrical charging circuit for the charging system. FIG. 5 shows the circuit diagram of the charge current source 11. FIG. 6 shows the circuit diagram of module 13 for charging either two or four "AA" cells. As explained above, a circuit diagram for a "C" or "D" cellholder module is not shown because it is electrically identical to that of module 13. It may be desirable when charging "C" or "D" cells to use a two-cell module comprising a system such as that making up compartments 39 and 41 of module 13 in the diagrams.

As shown in FIG. 5, the source 11 comprises a transformer 71 to make available from the standard 110–120 volt cycle AC line an output current of the appropriate magnitude for the load provided by module 13. The terminal 21 is centrally tapped to the secondary of transformer 71 to provide equal and opposite AC input voltages for module 13.

As shown in FIG. 6, the circuit for module 13 comprises two sections 73, 75 for accommodating either two or four AA cells for charging. If only two cells are to be charged at one time, both of the cells must be disposed in the same circuit section so as to form a complete charge current path. Section 73 connects a pair of AA cells 15, 16 disposed in compartments 39, 41 in a series relationship for charging via a charge current path formed by connection of module terminals 25, 27 to charger terminals 19, 21, respectively. Similarly, Section 75 connects a pair of AA cells 17, 18 disposed in compartments 43, 45 in a series relationship for charging via a charge current path formed by connection of module terminals 27, 29 to charger terminals 21, 23, respectively.

Another feature of this invention is provided by a pair of discharge current prevention means 77, 79 which are connected in sections 73, 75 respectively to prevent the inadvertent shorting of the branches 73, 75 when disconnected from source 11. In the illustrated embodiment the prevention means 77, 79 are provided in the form of diodes which are connected between each pair of cells 15, 16, at contacts 61, 69 and cells 17, 18 at contacts 81, 83. When cells are loaded in module 13, the cells in section 73, 75 are unable to deliver excessive power to a load connected between terminals 25, 27 and 29. This permits the module to be safely carried by the user with cells loaded therein without fear of inadvertently short-circuiting the circuit branches 73, 75 at the terminals 25, 27, 29. The diodes 77, 79 also rectify the current supplied by source 11 when module 13 is connected thereto.

The arrangement of the polarities of the cells 15, 16 with respect to cells 17, 18 is also an important feature of the invention. This arrangement would require a discharge current to flow in a counterclockwise direction in section 73 and in a clockwise direction in section 75. Thus, excessive power delivery to a load short circuited between contacts 69, 81 is prevented by the opposed polarity of cells 47, 48.

A further advantage of this arrangement is that cells 15, 16 are charged on the positive half cycle of the AC signal and cells 17, 18 are charged on the negative half cycle. Thus, the full AC wave is utilized for charging which results in efficient operation of the transformer.

While the preferred position of the diodes 77, 79 is, as shown in FIG. 6, in series between adjacent series connected cells, it will be recognized that the diodes can be positioned electrically in series between the module terminal and one of the cells in the series connected pair.

Also, while it is preferred to position the diode in the module both to rectify the charge current and to prevent high rate discharge of cells in the module, it will be recognized that the rectification of charge current could be performed by the incorporation of rectification means in the circuit of transformer 71 in charge current source 11 and that the high rate discharge prevention function could be provided by a fuse or resistor in the respective sections of the module circuits.

Another feature of this invention permits the charging of cells having different electrical characteristics with the same charge current source. For example, where a pair of "C" cells are to be charged, they are disposed in a module comparable to module 13 but which has different compartment dimensions and a different charge current capacity. In such a "C" cell module, no connection would be made to the center-tapped source terminal 21 and thus the total AC voltage developed by the transformer 71 is applied to the circuit of the module. A discharge current prevention means is connected in the circuit of the module intermediate the two cells. Similar to prevention means 77, 79 of module 13 for "AA" cells, the prevention means in a "C" cell module provides the dual function of preventing inadvertent high rate discharge of the cells by shorting across terminals between the cells and rectification of the AC output from source 11 during charging. Recommended charge current for certain AA cells is 50 mA while the preferred charge current for certain C and D cells is 100 mA. The charge current source 11 (FIG. 5) is designed to deliver a charge current of approximately 100 mA to a pair of "C" cells when the module is connected across the total EMF of the secondary of source 11. Source 11 thus delivers a charge current of approximately 50 mA to each pair of "AA" cells 15, 16, and 17, 18 when module 13 is connected to source 11. This result is achieved because each pair of AA cells is connected across one-half of the EMF of the secondary of source 11.

Thus, in accordance with this invention a simple, low cost charging system is provided for charging commonly available consumer cells such as AA, C and D. While the invention has been described in accordance with preferred embodiments thereof, it is not intended to be limited to the particular forms shown and described. Accordingly, the appended claims are intended to cover all modifications within the spirit and scope of the invention.

What is claimed is:

1. In a charging system comprising:
   a. a source of charge current comprising (1) a housing, (2) a transformer having a secondary winding disposed in said housing, and (3) first, second and third source terminals, said first and third source terminals connected to said winding, said second source terminal connected to said winding at a point intermediate of the connections of said first and third source terminals to said winding;
   b. a first cellholder charging module comprising (1) first, second and third module terminals for selective connection to said first, second and third source terminals, respectively; (2) compartment means for holding a plurality of cells for charging; (3) circuit means connecting at least one cell in series between said first and second module terminals and between said second and third module terminals, respectively; and
   c. a second charging module comprising (1) compartment means for holding at least one cell of a physical size different from said compartment means of said first module and (2) having only first and second module terminals for connection, respectively, to said first and third source terminals, the improvement which comprises charging modules which contain compartments for holding said cells wherein each of said compartments is defined by one or two pair of resilient side wall loading tab means, a pair of partition walls which partially separate adjacent compartments, an end wall in the base of said module, and an upper resilient arm radiating from the central axis of the module, which forms the upper end of said compartment, wherein said resilient loading tabs and resilient upper arm restrict the opening of said compartment to a dimension less than that of the cell type to be accommodated in said compartment but which tabs and arm are capable of being deflected in a manner increasing the dimensions of the opening to allow a cell to be introduced and removed from the compartment.

2. The system of claim 1 wherein each compartment of said charging modules contain two pair of resilient side wall loading tab means.

3. The system of claim 1 wherein said upper resilient arm is composed of an acetal homopolymer.

4. The system of claim 1 further comprising a discharge limitation means for limiting the magnitude of a discharge current flow from said module terminals.

5. The system of claim 4 wherein said discharge limitation means further functions to rectify charge current from said charger.

6. The system of claim 4 wherein said discharge limitation means is a diode connected in circuit with said circuit means.

7. The system of claim 1 wherein said first module circuit means is for connecting a first pair of cells in series with said first and second module terminals and is for connecting a second pair of cells in series with said second and third module terminals.

8. The system of claim 7 wherein said current source supplies charge current in a first direction between said first and second terminals of said first module in a second direction, opposite to said first direction, between said third and second terminals of said first module; and wherein the polarities of said first pair of cells arranged in circuit opposite to the polarities of said second pair of cells thereby to prevent high rate discharge by short circuiting across a cell of said first pair and a cell of said second pair.

9. The system of claim 8 wherein said first module further comprises discharge limitation means for limiting a discharge current flow through the respective terminals of each said module.

10. The system of claim 9 wherein said discharge limitation means additionally functions for full wave rectification of the charge current from said source.

11. The system of claim 10 wherein said compartment means accommodate said first pair of cells in a side by side relationship with the polarities thereof physically aligned in opposite direction and accommodates said second pair of cells in side by side relationship with the polarities thereof physically aligned in opposite directions, said first and second pairs in a back to back relationship, said discharge limitation means comprise a first diode connected in circuit between said first pair of cells and a second diode connected in circuit between said second pair of cells.

12. The system of claim 1 wherein an eyelet is present in the upper resilient arm which forms an electrical contact with the terminal of the cell adjacent thereto.

13. In a charging system comprising:
  a. a source of charge current comprising (1) a housing, (2) a transformer having a secondary winding disposed in said housing, and (3) first, second and third source terminal, said first and third source terminals connected to said winding, said second source terminal connected to said winding at a point intermediate of the connections of said first and third source terminals to said winding;
  b. a cellholder charging module comprising (1) first, second and third module terminals for selective connection to said first, second and third source terminals, respectively; (2) compartment means for holding a first pair of cells in a side by side relationship with the polarities thereof physically aligned in opposite directions and a second pair of cells in side by side relationship with the polarities thereof physically aligned in opposite directions, said first and second pairs in a back to back relationship; and (3) circuit means connecting said first pair of cells in series with said first and second module terminals and a second pair of cells in series with said second and third module terminals, the polarities of said first pair of cells arranged in circuit opposite to the polarities of said second pair of cells thereby to prevent high rate discharge by short circuiting across a cell of said first pair and a cell of said second pair, said circuit means comprising a first diode connected in circuit between said first pair of cells and a second diode connected in circuit between said second pair of cells, the improvement which comprises charging modules which contain compartments for holding said cells wherein each of said compartments is defined by one or two pair of resilient side wall loading tab means, a pair of partition walls which partially separate adjacent compartments, an end wall in the base of said module, and an upper resilient arm radiating from the central axis of the module which forms the upper end of said compartment, wherein said resilient loading tabs and resilient upper arm restrict the opening of said compartment to a dimension less than that of the cell type to be accommodated in said compartment but which tabs and arm are capable of being deflected in a manner increasing the dimensions of the opening to allow a cell to be introduced and removed from the compartment.

14. In a cellholder charging module useful in a charging system for rechargeable electrical cells wherein said module comprises:
  a. compartment means for accommodating a first pair of cells in a side-by-side relationship with the polarities thereof physically aligned in opposite directions and a second pair of cells in side-by-side relationship with the polarities thereof physically aligned in opposite directions, said first and second pairs of cells in a back-to-back relationship;
  b. first, second and third module terminals for selective connection to the terminals of an outside source; and
  c. circuit means for connecting said first pair of cells in series with said first and second module terminals and for connecting said second pair of cells in series with said second and third module terminals, the improvement which comprises compartment means wherein each of said compartment means are defined by one or two pair of resilient side wall loading tab means, a pair of partition walls which partially separate adjacent compartments, an end wall in the base of said module, and an upper resilient arm radiating from the central axis of the module which forms the upper end of said compartment, wherein said resilient loading tabs and resilient upper arm restrict the opening of said compartment to a dimension less than that of the cell type to be accommodated in said compartment but which tabs and arm are capable of being deflected in a manner increasing the dimensions of the opening to allow a cell to be introduced and removed from the compartment.

15. The cellholder charging module of claim 14 further comprising a discharge limitation means for limiting the magnitude of a discharge current flow from said module terminals.

16. The cellholder charging module of claim 15 wherein said discharge limitation means further functions to rectify charge current from said charger.

17. The cellholder charging module of claim 15 wherein said discharge limitation means is a diode connected in circuit with said circuit means.

18. The cellholder charging module of claim 15 wherein an eyelet is present in the upper resilient arm which forms an electrical contact with the terminal of the cell adjacent thereto.

* * * * *